US012460585B1

United States Patent
Lee et al.

(10) Patent No.: US 12,460,585 B1
(45) Date of Patent: Nov. 4, 2025

(54) COMBUSTION DEVICE CONTROL SYSTEM AND COMBUSTION DEVICE CONTROL METHOD

(71) Applicant: NATIONAL TAIPEI UNIVERSITY of TECHNOLOGY, Taipei (TW)

(72) Inventors: Da-Sheng Lee, Taipei (TW); Shang-Tse Lee, Taipei (TW); Yen-Tang Chen, Taipei (TW)

(73) Assignee: NATIONAL TAIPEI UNIVERSITY of TECHNOLOGY, Taipei (TW)

( * ) Notice: Subject to any disclaimer, the term of this patent is extended or adjusted under 35 U.S.C. 154(b) by 0 days.

(21) Appl. No.: 18/977,983

(22) Filed: Dec. 12, 2024

(30) Foreign Application Priority Data

Nov. 8, 2024 (TW) ................................. 113143059

(51) Int. Cl.
| | |
|---|---|
| *F02C 9/16* | (2006.01) |
| *F02C 9/28* | (2006.01) |
| *F02C 9/50* | (2006.01) |
| *F23R 3/26* | (2006.01) |

(52) U.S. Cl.
CPC .................. *F02C 9/16* (2013.01); *F02C 9/28* (2013.01); *F02C 9/50* (2013.01); *F23R 3/26* (2013.01)

(58) Field of Classification Search
CPC .... F02C 9/16; F02C 9/26; F02C 9/263; F02C 9/28; F02C 9/40; F02C 9/48; F02C 9/50; F23R 3/26
See application file for complete search history.

(56) References Cited

U.S. PATENT DOCUMENTS

| | | | |
|---|---|---|---|
| 4,059,385 A | 11/1977 | Gulitz et al. | |
| 5,186,146 A | 2/1993 | Sohma et al. | |
| 7,966,834 B2 * | 6/2011 | Myhre | F23N 5/082 60/803 |
| 8,371,102 B1 * | 2/2013 | Lee | F02C 9/28 356/939 |
| 9,822,710 B2 * | 11/2017 | Brickwood | F23N 5/242 |
| 10,287,993 B2 * | 5/2019 | Brickwood | F23R 3/343 |

(Continued)

FOREIGN PATENT DOCUMENTS

| | | |
|---|---|---|
| CN | 101802369 A | 8/2010 |
| CN | 115095884 A | 9/2022 |

(Continued)

*Primary Examiner* — William H Rodriguez
(74) *Attorney, Agent, or Firm* — CKC & Partners Co., LLC (57) ABSTRACT

Combustion device control system performs operations: executing an automatic control mode according to a plurality of initial combustion parameters by a processor to obtain combustion trend scores at each of a plurality of time points; obtaining a first combustion light wavelength of combustion chamber at a first time point of time points; evaluating a combustion situation at first time point according to first combustion light wavelength to obtain a combustion state score; outputting control signals at a second time point to a plurality of valve controllers according to combustion trend score and combustion state score corresponding to first time point, which second time point is later than first time point; and adjusting a first gas in first air inlet and a second gas in second air inlet according to control signals at second time point by gas valve controllers of each of first air inlet and second air inlet.

13 Claims, 7 Drawing Sheets (56) References Cited

U.S. PATENT DOCUMENTS

| | | | |
|---|---|---|---|
| 2006/0000219 A1* | 1/2006 | Myhre | F23N 5/082 |
| | | | 60/803 |
| 2007/0119147 A1* | 5/2007 | Cornwell | F01D 21/003 |
| | | | 60/39.281 |
| 2007/0234730 A1* | 10/2007 | Markham | G01N 21/359 |
| | | | 431/13 |
| 2010/0071375 A1* | 3/2010 | Myhre | G01J 5/0014 |
| | | | 60/740 |
| 2013/0213052 A1* | 8/2013 | Brickwood | F23R 3/34 |
| | | | 60/776 |
| 2013/0247576 A1* | 9/2013 | Myhre | F23N 5/082 |
| | | | 60/803 |
| 2017/0328284 A1* | 11/2017 | Brickwood | F23R 3/343 |
| 2021/0207802 A1 | 7/2021 | Brauns et al. | |

FOREIGN PATENT DOCUMENTS

| | | | | |
|---|---|---|---|---|
| CN | 116357463 A | 6/2023 | | |
| CN | 117371313 A | 1/2024 | | |
| EP | 2180311 A1 * | 4/2010 | | F23N 5/082 |
| EP | 3628926 A1 * | 4/2020 | | F23N 1/002 |
| JP | H0693882 A * | 4/1994 | | |
| JP | H07107443 B2 * | 11/1995 | | |
| JP | H0826988 B2 * | 3/1996 | | |
| JP | 2008151512 A | 7/2008 | | |
| JP | 7394617 B2 | 12/2023 | | |

* cited by examiner

COMBUSTION DEVICE CONTROL SYSTEM AND COMBUSTION DEVICE CONTROL METHOD

CROSS-REFERENCE TO RELATED APPLICATION

This application claims priority to Taiwan Application Serial Number 113143059, filed Nov. 8, 2024, which is herein incorporated by reference in its entirety.

BACKGROUND

Field of Invention

The present disclosure relates to control system and a control method. More particularly, the present disclosure relates to a combustion device control system and a combustion device control method.

Description of Related Art

In recent years, industrial boilers are energy-intensive equipment. Industrial boilers consume a large amount of fossil fuels during the production process, resulting in significant greenhouse gas emissions and serious impact on the environment. Conventional boiler control technologies mostly rely on traditional methods, which often have limited effects in reducing carbon emissions and improving energy efficiency.

For the foregoing reasons, there is a need for providing a suitable combustion device control system and a combustion device control method to solve the above problems encountered in related art approaches.

SUMMARY

One aspect of the present disclosure provides a combustion device control system. The combustion device control system includes a plurality of sensors and a processor. Thea plurality of sensors are respectively disposed in a gas valve controller of each of a first air inlet and a second air inlet in a combustion chamber of a combustion device. The processor is coupled to the sensors and the gas valve controllers of the first air inlet and the second air inlet. The combustion device control system is configured to perform operations: executing an automatic control mode according to a plurality of initial combustion parameters by the processor to obtain a combustion trend score at each of a plurality of time points; obtaining a first combustion light wavelength of the combustion chamber at a first time point of the time points by the sensors; evaluating a combustion situation at the first time point according to the first combustion light wavelength by the processor to obtain a combustion state score; outputting a control signal at a second time point to the gas valve controllers according to the combustion trend score and the combustion state score corresponding to the first time point by the processor, wherein the second time point is later than the first time point; and adjusting a first gas in the first air inlet and a second gas in the second air inlet according to the control signal at the second time point by the gas valve controller of each of the first air inlet and the second air inlet.

Another aspect of the present disclosure provides a combustion device control method. The combustion device control method is adapted to a combustion device control system. The combustion device control system includes a plurality of sensors and a processor. The processor is coupled to at least two gas valve controllers of a combustion device. The combustion device combustion device control method comprises: executing an automatic control mode according to a plurality of initial combustion parameters by the processor to obtain a combustion trend score at each of a plurality of time points; obtaining a first combustion light wavelength of the combustion chamber at a first time point of the time points by the sensors; evaluating a combustion situation at the first time point according to the first combustion light wavelength by the processor to obtain a combustion state score; outputting a control signal at a second time point to the gas valve controllers according to the combustion trend score and the combustion state score corresponding to the first time point by the processor, wherein the second time point is later than the first time point; and respectively adjusting an air inlet hole for a first gas and an air inlet hole for a second gas of the combustion device according to the control signal at the second time point by the at least two gas valve controllers.

In view of the aforementioned shortcomings and deficiencies of the prior art, the present disclosure provides a technology for a combustion device control system and a combustion device can improve the combustion efficiency, while also helping to reduce environmental pollution and extend a life of a combustion device, thereby achieving both environmental protection and high combustion efficiency in a combustion process.

BRIEF DESCRIPTION OF THE DRAWINGS

The present disclosure can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

Figure 1:
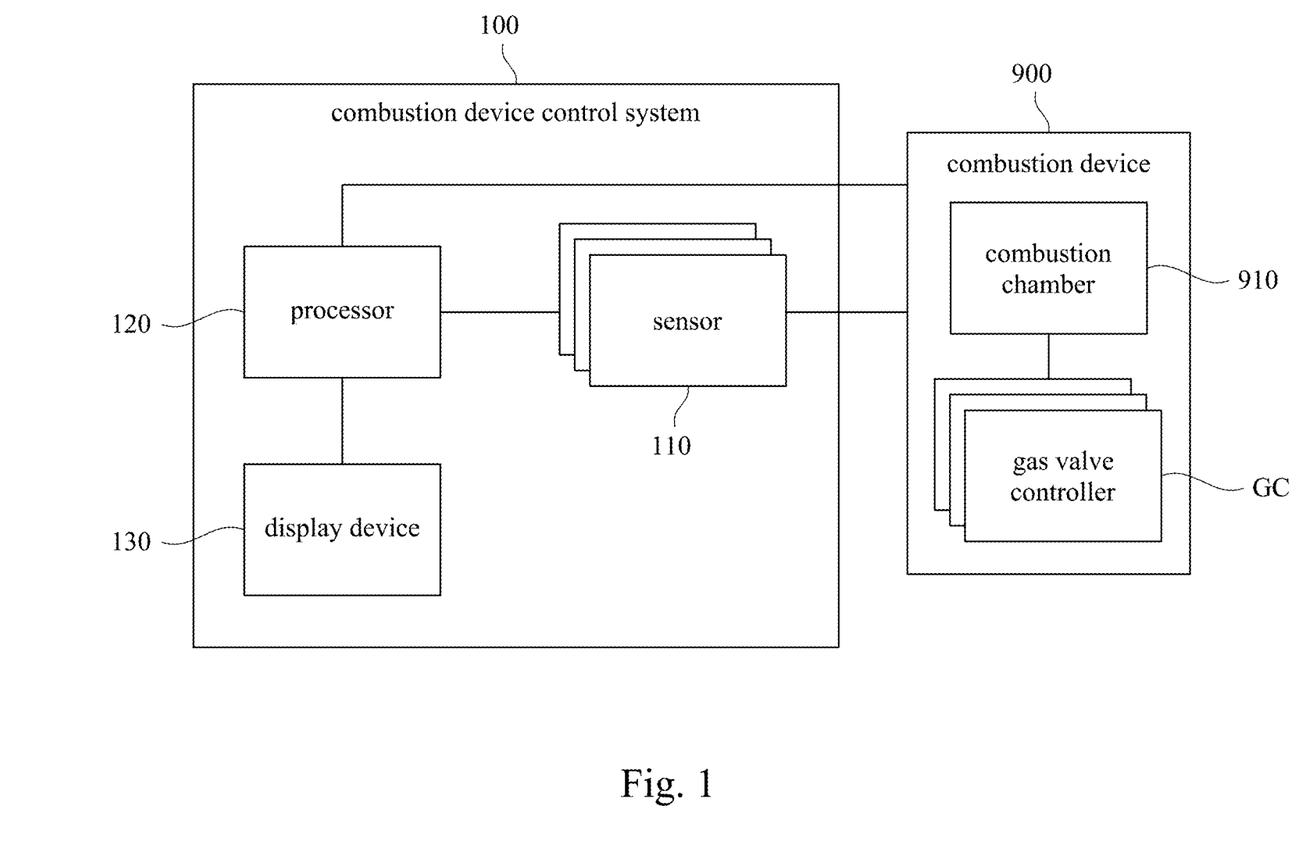
FIG. 1 depicts a schematic diagram of a combustion device control system according to some embodiments of the present disclosure.

FIG. 1 depicts a schematic diagram of a combustion device control system 100 and a combustion device 900 according to some embodiments of the present disclosure. In some embodiments, please refer to FIG. 1, the combustion device control system 100 includes a plurality of sensors 110, a processor 120 and a display device 130. The combustion device 900 includes a combustion chamber 910 and a plurality of gas valve controllers GC. The processor 120 is coupled to the plurality of sensors 110, the display device 130 and the plurality of gas valve controllers GC. The plurality of sensors 110 are arranged around the combustion chamber 910. The plurality of gas valve controllers GC are disposed at positions of a plurality of air inlets of the combustion chamber 910.

In some embodiments, the plurality of sensors 110 are configured to collect a plurality of combustion parameters of the combustion chamber 910. The plurality of combustion parameters can include a temperature of the combustion chamber 910 during combustion, an internal pressure of the combustion chamber 910 during combustion, a gas pressure, a gas supply speed and a gas concentration of a plurality of gases (e.g.: combustion gas or oxygen) entering the combustion chamber 910, a gas concentration of exhaust gas (e.g.: COx or NOx) after combustion in the combustion chamber 910 or an optical spectrum of a combustion light of the combustion chamber 910 during combustion and so on.

In some embodiments, the plurality of sensors 110 are be implemented as temperature sensors, pressure sensors, gas sensors and image sensors to collect aforementioned data of combustion parameters. In some embodiments the plurality of sensors 110 are be implemented as charge-coupled devices (CCD), thermocouples and non-contact pyrometers). It should be noted that the plurality of sensors 110 can be can be designed according to actual needs and are not limited to the embodiment of the present disclosure.

In some embodiments, the processor 120 is configured to process pieces of data from a plurality of sensors 110 to real-time control the gas valve controllers GC disposed around the combustion chamber 910 in the combustion device 900. In some embodiments, the processor 120 includes but not limited to a single processor and an integration of many micro-processors, for example, a central processing unit (CPU) or a graphic processing unit (GPU) and so on.

In some embodiments, the display device 130 can be implemented as a display panel. The display panel is configured to provide a graphical user interface (GUI) to receive operation instructions of a user, and then allow the processor 120 to operate according to the operation instructions of a user.

In some embodiments, the combustion device 900 can be implemented as various types of industrial boilers or cylinders in car engines. For example, the combustion device 900 can be implemented as a boiler for oil, natural gas, biomass fuel, and so on. The combustion device 900 can be implemented as cylinders in an engine of electric or fuel vehicles. The combustion device 900 can be can be designed according to actual needs and is not limited to the embodiment of the present disclosure. The combustion chamber 910 an area in a gas turbine engine, ramjet, scramjet, or boiler which is configured to burn fuel or gas.

Figure 2:
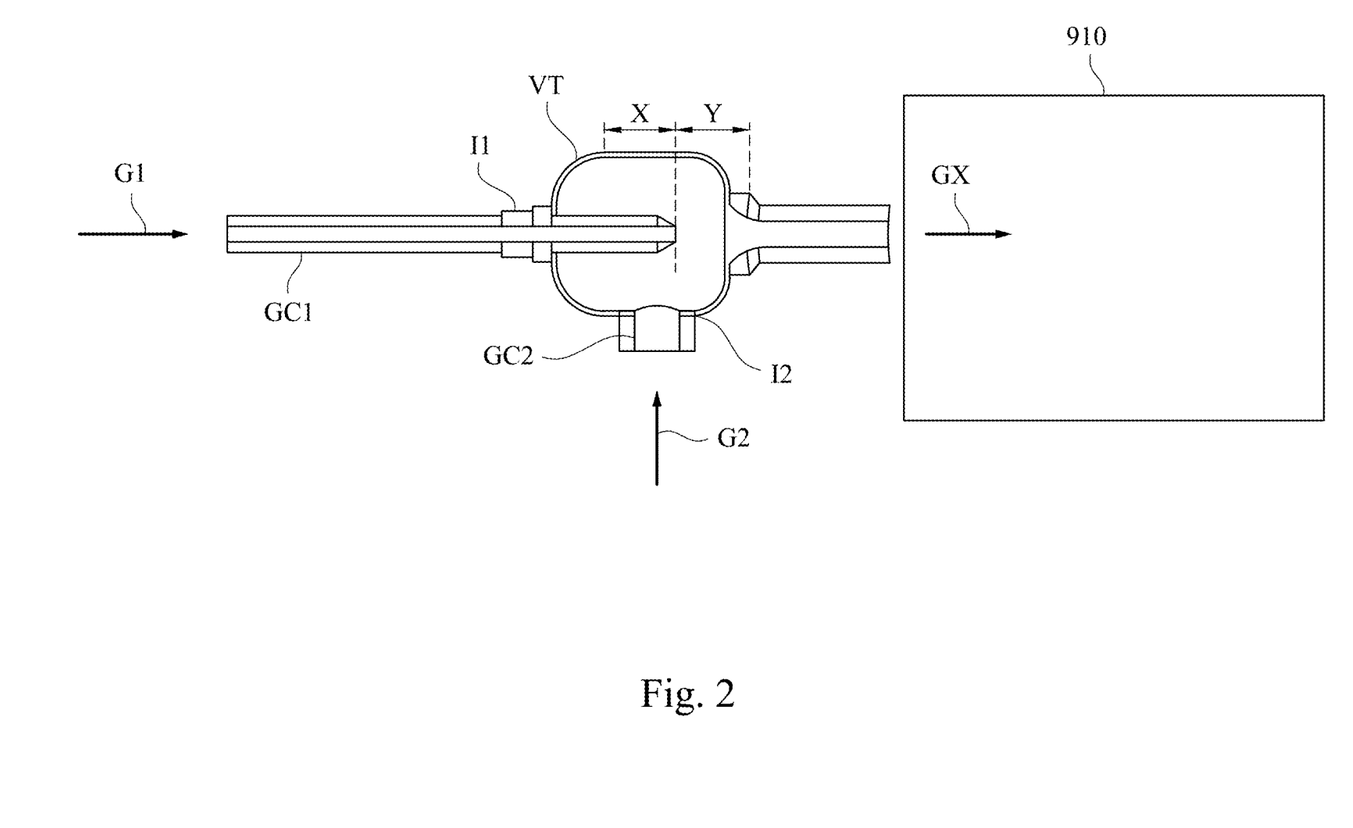
FIG. 2 depicts a schematic diagram of a partial structure of a combustion device and a combustion device control system according to some embodiments of the present disclosure.

In order to facilitate the understanding a partial structure of the combustion chamber 910 of the combustion device 900, please refer to FIG. 1 to FIG. 2 together. FIG. 2 depicts a schematic diagram of a partial structure of a combustion device control system 100 and a combustion device 900 according to some embodiments of the present disclosure. In some embodiments, please refer to FIG. 1 and FIG. 2, a venturi tube VT is disposed at an air inlet of the combustion device 900. The venturi tube VT respectively includes two gas valves and gas valve controllers corresponding to the two gas valves (e.g.: a gas valve controller GC1 and a gas valve controller GC2). The gas valve controller GC1 is configured to control the gas valve of the air inlet I1 of the venturi tube VT to adjust a gas supply speed and a gas concentration of a first gas G1. The gas valve controller GC2 is configured to control the gas valve of the air inlet I2 of the venturi tube VT to adjust a gas supply speed and a gas concentration of a second gas G2.

In some embodiments, the first gas G1 and the second gas G2 are different. For example, the first gas G1 can be implemented as nitrogen gas or oxygen gas. The second gas G2 can be implemented as can be implemented as petroleum gas (hydrocarbon mixture gas), natural gas (i.e.: the main component is methane) and biogas (also known as biomass gas).

In some embodiments, the venturi tube VT is further configured to adjust gas inlet positions (e.g. position X or position Y) of the first gas G1 or the second gas G2 so as to dynamically adjust the pressure and gas supply speed of the first gas G1 or the second gas G2, thereby affecting a mixing efficiency and a mixing state of the first gas G1 or the second gas G2 (such as mixed gas GX). A purpose of setting up the venturi tube VT is to make one of the first gas G1 and the second gas G2 cover the other of the first gas G1 and the second gas G2, so as to prevent a temperature of an outer layer from being too high during combustion, which will shorten a life of the combustion chamber 910.

Figure 3:
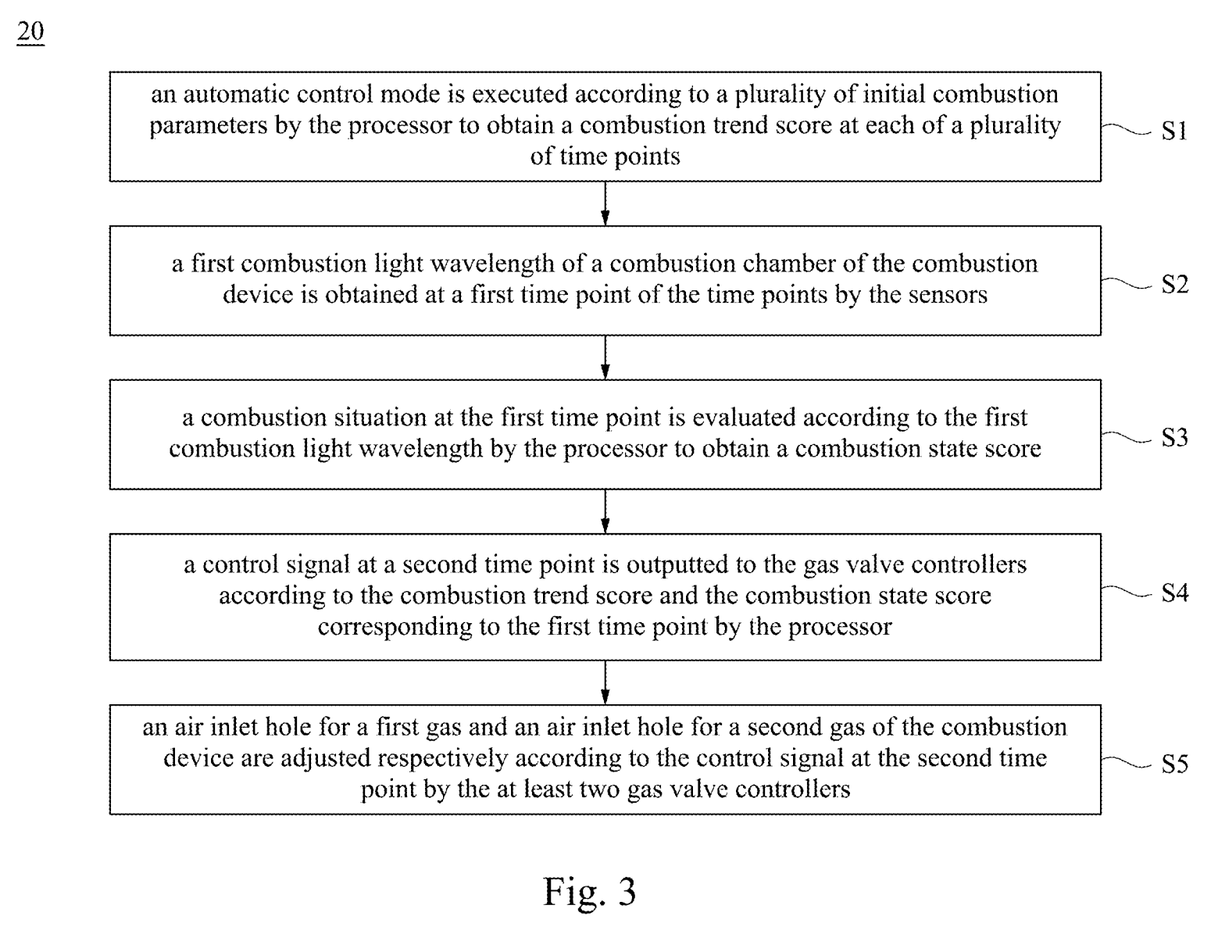
FIG. 3 depicts schematic flow chart of steps of a combustion device control method according to some embodiments of the present disclosure.
Figure 4:
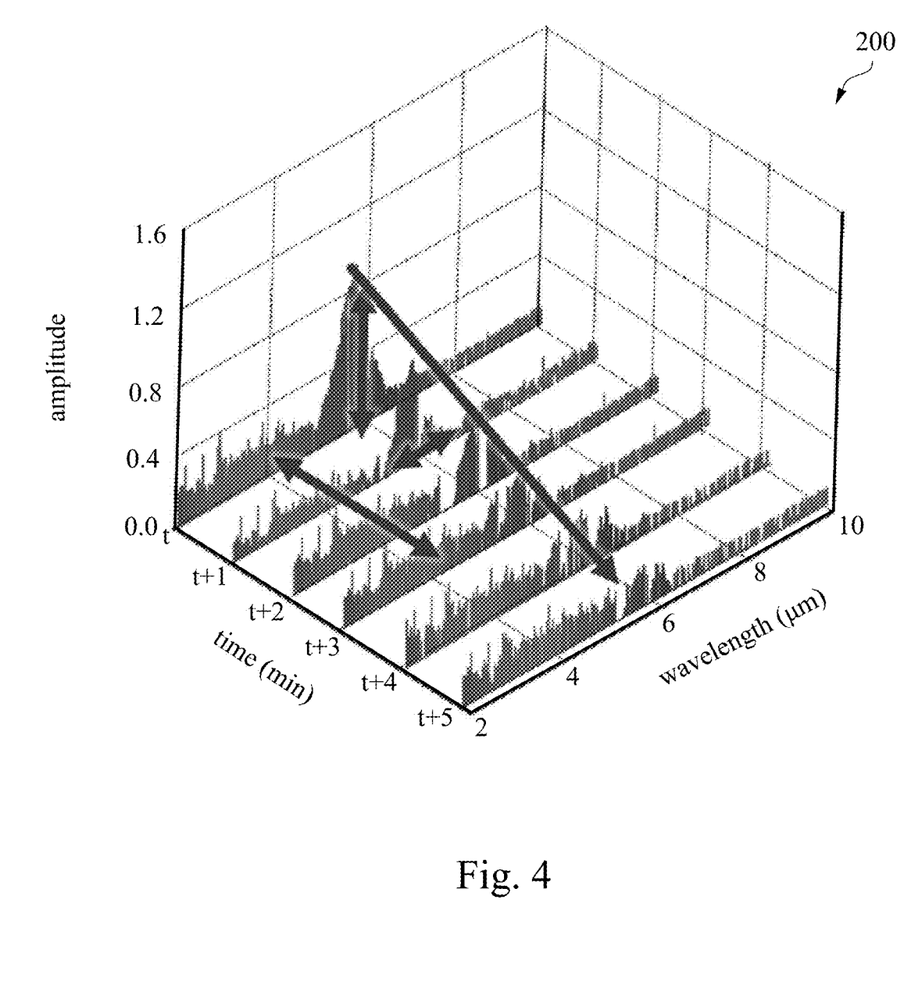
FIG. 4 depicts a schematic spectrum diagram of a combustion chamber during combustion according to some embodiments of the present disclosure.

In order to facilitate the understanding detail operations of the combustion device control system 100, please refer to FIG. 1, FIG. 2, FIG. 3 and FIG. 4. FIG. 3 depicts schematic flow chart of steps of a combustion device control method 20 according to some embodiments of the present disclosure. The combustion device control method 20 includes steps S1 to S5. In some embodiments, the combustion device control method 20 can be executed by the combustion device control system 100. FIG. 4 depicts a schematic spectrum diagram 200 of the combustion chamber 910 in FIG. 1 or in FIG. 2 during combustion according to some embodiments of the present disclosure. The spectrum diagram 200 is configured to present a spectrum diagram of lights converted during combustion of the combustion chamber 910. One axis (i.e.: Y-axis) is a combustion time (its unit is minute (min)), another axis (i.e: X-axis) is a wavelength of the light signal (its unit is micrometers (μm)), and the other axis (i.e.: Z-axis) is an intensity of the light signal (i.e. light intensity, its unit is candlelight (cd)).

In step S1, please refer to FIG. 1, FIG. 2, FIG. 3 and FIG. 4, the processor 120 of the combustion device control system 100 is configured to execute an automatic control mode according to a plurality of initial combustion parameters to obtain a combustion trend score at each of a plurality of time points.

In detail, the processor 120 of the combustion device control system 100 is configured to execute an automatic control mode. Under the automatic control mode, the processor 120 is configured to calculate a combustion trend score at each of a time point t, a time point t+1, a time point t+2, a time point t+3, a time point t+4 and a time point t+5 according to the plurality of initial combustion parameters (e.g. a current temperature of the combustion chamber 910 of the combustion device 900, a gas pressure, a gas supply speed and a gas concentration of each of the first gas G1 and the second gas G2) before the time point t. The combustion trend score is a score of the processor 120's predictability under normal combustion conditions according to the initial conditions (i.e. the aforementioned initial combustion parameters).

In some embodiments, the processor 120 of the combustion device control system 100 is configured to generate a plurality of combustion parameter combinations according to the plurality of initial combustion parameters (e.g. the current temperature of the combustion chamber 910 of the combustion device 900, the gas pressure, the gas supply speed and the gas concentration of each of the first gas G1 and the second gas G2). Here, the combustion parameter combination is a combination of combustion parameters in which one of the plurality of initial combustion parameters is adjusted by the processor 120 of the combustion device control system 100 and is different from the plurality of initial combustion parameters.

For example, the plurality of initial combustion parameters are: a current temperature of the combustion chamber 910 is 25° C., a gas supply speed of the first gas G1 is 0.5 liters/second, a gas concentration of the first gas G1 is 80%, a gas pressure of the first gas G1 is 12.5 kg/cm$^2$, a gas supply speed of the second gas G2 is 0.8 liters/second, a gas concentration of the second gas G2 is 90%, a gas pressure of the second pressure G2 is 10 kg/cm$^2$. The aforementioned plurality of initial combustion parameters is a combination of combustion parameters. Then, after the processor 120 of the combustion device control system 100 is configured to adjust at least one of the initial combustion parameters in the combustion parameter combination, it can be regarded as a new combustion parameter combination.

The processor 120 is configured to determine a target combustion parameter combination according to the combustion parameter combinations. In detail, the processor 120 of the combustion device control system 100 is configured to execute a digital twin mode to establishing a plurality of three-dimensional models corresponding to the combustion chamber 910. In other words, the processor 120 is configured to convert an internal structure of the combustion chamber 910 into a plurality of virtual three-dimensional models. In some embodiments, the digital twin model applies Bayes' theorem to more accurately predict combustion conditions and combustion trend scores by analyzing accumulated data of a large number of previous combustions (such as historical combustion efficiency, common failure modes, etc.).

The processor 120 is configured to execute each of the combustion parameter combinations by the three-dimensional models respectively to generate a simulation result corresponding to each of the combustion parameter combinations.

Then, the processor 120 is configured to calculate an expectation value of each of the simulation results. The processor 120 is configured to select a target expectation value from the expectation values according to a plurality of preset thresholds (e.g. such as meeting a plurality of preset thresholds). The processor 120 is configured to determine the target combustion parameter combination according to the target expectation value (i.e. the best combustion parameter combination).

The processor 120 is configured to obtain the combustion trend score at each of the time points according to the target combustion parameter combination.

In some embodiments, please refer to FIG. 1, FIG. 2, FIG. 3 and FIG. 4, the processor 120 is configured to obtain pieces of six-dimensional data map from the plurality of sensors 110, and obtain the combustion trend scores according to the pieces of six-dimensional data. The pieces of six-dimensional data are time, frequency, amplitude, phase, trend of signals and a rate of change. Time represents time series dimension of signals, that is, states of signal at different points in time. Frequency represents a change of a signal in a frequency domain, such as frequency component obtained through Fourier transform. Amplitude represents strength or size of a signal in a time domain or a frequency domain. Phase is pieces of phase information of signals in s frequency domain, which is very important for understanding synchronization characteristics of a waveform of signals. Trend of signals represents a long-term trend of signals over time, which may be obtained through linear or nonlinear trend analysis. Rate of change may represent a derivative of the signal (i.e., velocity or acceleration), or the advanced statistical characteristics of the signal, such as the skewness and kurtosis of the signal.

In step S2, after the combustion chamber 910 of the combustion device 900 starts operating (that is, the first gas G1 and the second gas G2 are mixed and started to burn), the sensors 110 of the combustion device control system 100 are configured to respectively obtain the combustion light wavelengths (e.g. 6 μm) of the combustion chamber 910 of the combustion device 900 at a plurality of time points (e.g. the time point t). It should be noted that the wavelength of the combustion light (e.g., 6 μm) is the light energy generated after the first gas G1 or the second gas G2 is burned.

In step S3, following the aforementioned step S2, the processor 120 of the combustion device control system 100 is configured to evaluate a combustion situation at the time point (e.g. the time point t) according to the combustion light wavelength (e.g., 6 μm) to obtain the combustion state score. In other words, the processor 120 can determine whether the combustion situation is in a combustion complete state or in a combustion incomplete state through an amplitude of an optical signal.

In some embodiments, following content of the aforementioned step S3, the processor 120 of the combustion device control system 100 is configured to evaluate the combustion situation at the time point through combustion light wavelength (e.g., 6 μm) corresponding to a gas concentration of at least post combustion gas to obtain the combustion state score. In other words, the processor 120 can determine whether the combustion situation is in a combustion complete state or in a combustion incomplete state through concentration of products after combustion. In some embodiments, the at least one post combustion gas comprises at least one of sulfur oxides, carbon oxide and nitrogen oxides.

In step S4, please refer to FIG. 1, FIG. 2, FIG. 3 and FIG. 4, following the aforementioned step S3, the processor 120 of the combustion device control system 100 is configured to output a control signal at another time point (e.g., a time point after time point t+3) according to the combustion trend score and the combustion state score corresponding to the time point (e.g., the time point t) to the at least two gas valve controllers (e.g., the gas valve controller GC1 and the gas valve controller GC2).

In step S5, the at least two gas valve controllers (e.g., the gas valve controller GC1 and the gas valve controller GC2) are configured to respectively adjust the air inlet hole I1 for the first gas G1 and the air inlet hole I2 for the second gas G2 of the combustion device 900 according to the control signal at the future time point (e.g., a time point after time point t+3).

In some embodiments, please refer to FIG. 1, FIG. 2, FIG. 3 and FIG. 4, the processor 120 of the combustion device control system 100 is further configured to determine whether the combustion trend score corresponding to the time point (e.g., the time point t) is less than the combustion state score corresponding to the time point (e.g., the time point t).

Figure 5:
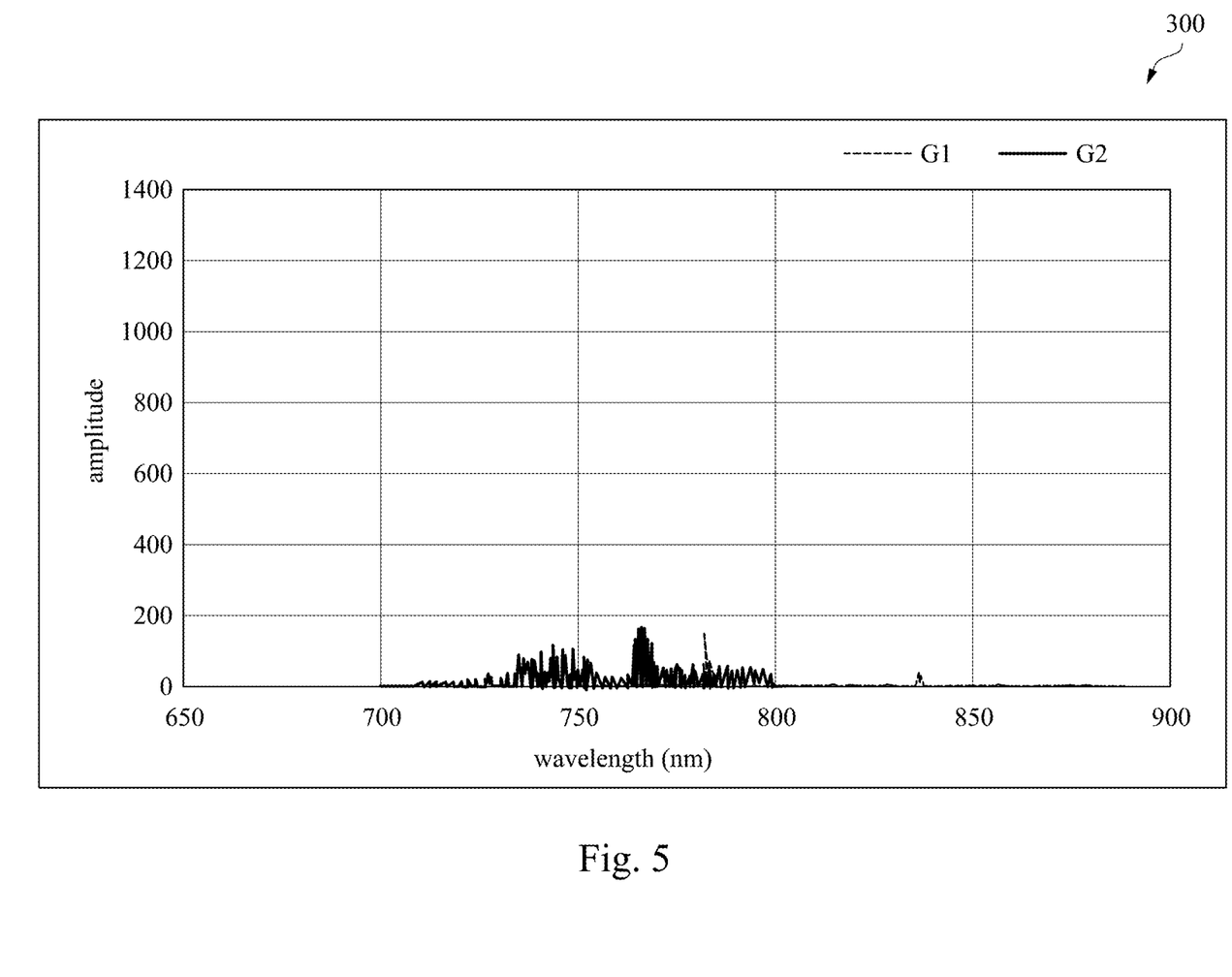
FIG. 5 depicts a schematic diagram of a state of complete combustion of two gases according to some embodiments of the present disclosure.

Please refer to FIG. 4 and FIG. 5, FIG. 5 depicts a schematic diagram 300 of a state of complete combustion of two gases (e.g. the first gas G1 and the second gas G2) according to some embodiments of the present disclosure. In response to the combustion trend score being less than the combustion state score at the time point (e.g. the time point t), the processor 120 of the combustion device control system 100 is configured to output the control signals the gas valve controller GC1 and the gas valve controller GC2 to a pressure adjustment range of each of the first gas G1 and the second gas G2 at the time point (e.g. a time point after time point t+3). It should be noted that the combustion trend score is less than the combustion state score, it means that a combustion condition is better than an expected combustion condition, and the first gas G1 and the second gas G2 do not need to maintain a higher gas supply pressure.

Figure 6:
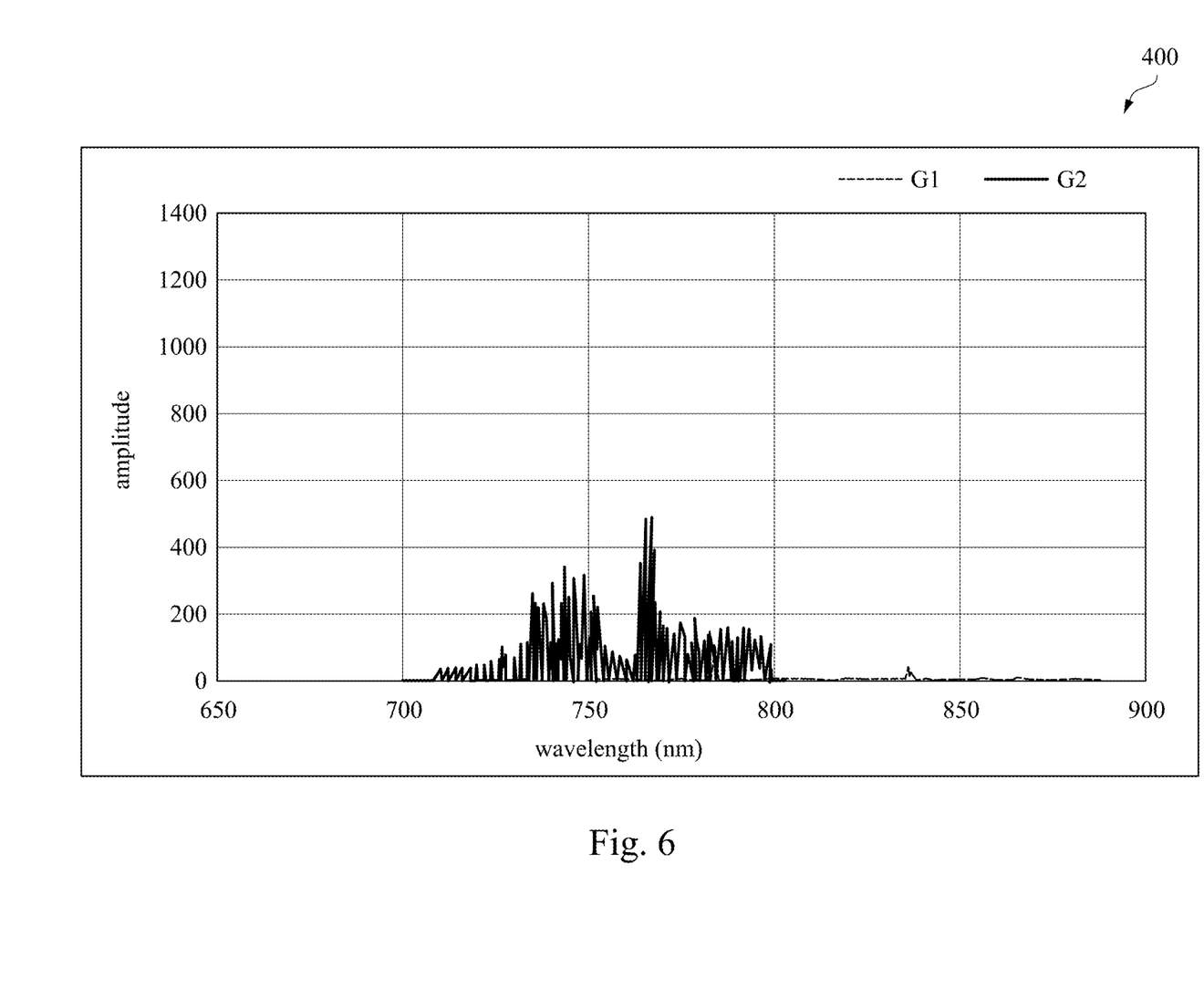
FIG. 6 depicts a schematic diagram of a state of incomplete combustion of one of two gases according to some embodiments of the present disclosure.
Figure 7:
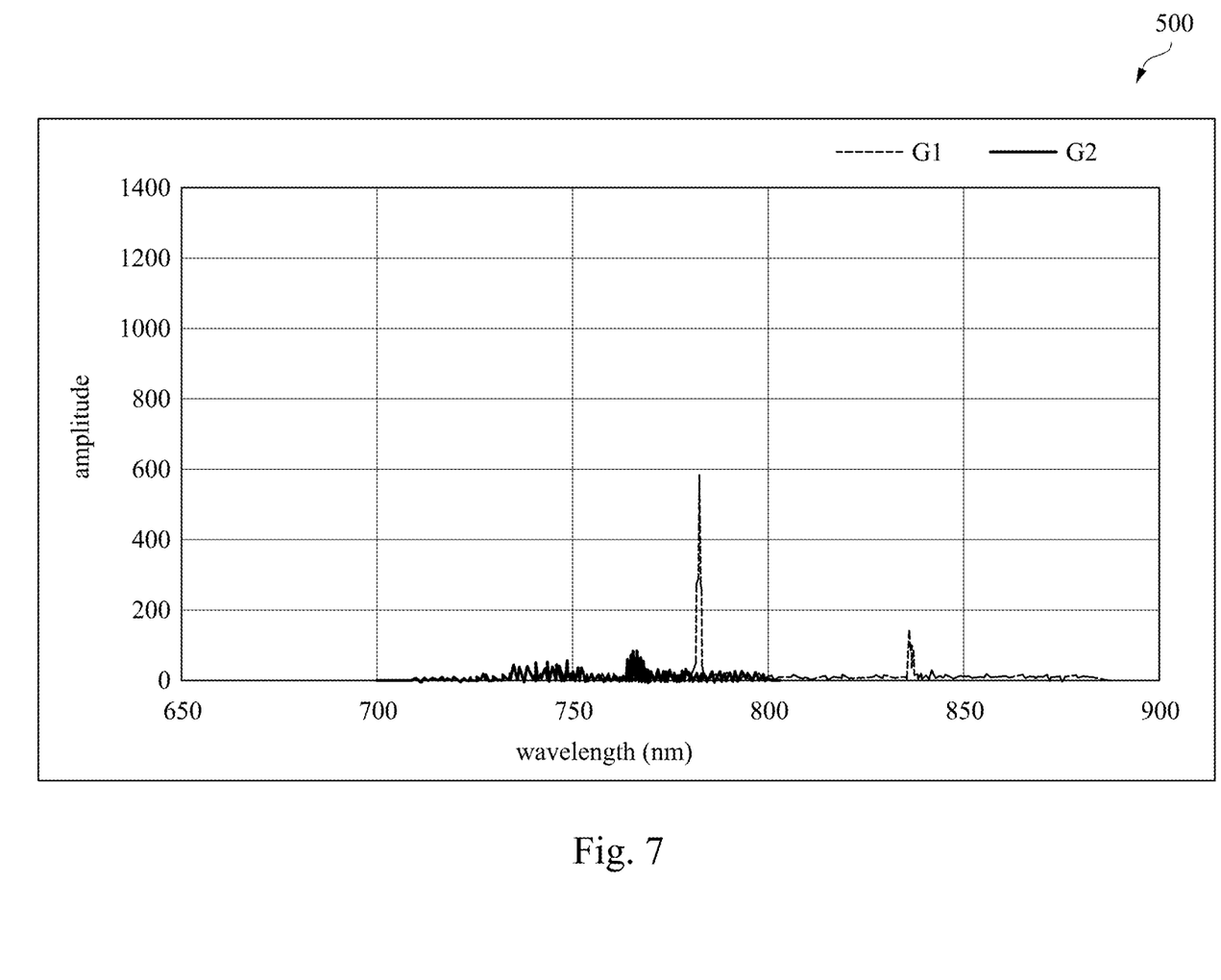
FIG. 7 depicts a schematic diagram of a state of incomplete combustion of one of two gases according to some embodiments of the present disclosure.

Please refer to FIG. 4, FIG. 6 and FIG. 7, FIG. 6 depicts a schematic diagram 400 of a state of incomplete combustion of one of two gases (e.g. the second gas G2) according to some embodiments of the present disclosure. FIG. 7 depicts a schematic diagram 500 of a state of incomplete combustion of one of two gases (e.g. the first gas G1) according to some embodiments of the present disclosure. In response to the combustion trend score being not less than the combustion state score at the time point (e.g. the time point t), the processor 120 of the combustion device control system 100 is configured to output the control signals the gas valve controller GC1 and the gas valve controller GC2 to enlarging the pressure adjustment range of each of the first gas G1 and the second gas G2. It should be noted that the combustion trend score is not less than the combustion state score, it means that a combustion condition is worse than an expected combustion condition, and both the first gas G1 and the second gas G2 need to increase the gas supply pressures so that the first gas G1 and the second gas G2 can be burned completely.

In some embodiments, the combustion device control method 20 of the present disclosure operates in the automatic control mode. If a user has immediate needs, the user can input operating instructions through the display device 130 to switch from the automatic control mode to a manual control mode. The user can adjust various combustion parameters during combustion in the manual control mode.

Based on the aforementioned embodiments, the present disclosure provides a technology for a combustion device control system and a combustion device can improve the combustion efficiency, while also helping to reduce environmental pollution and extend a life of a combustion device, thereby achieving both environmental protection and high combustion efficiency in a combustion process.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:
1. A combustion device control system, comprising:
a plurality of sensors; and
a processor, coupled to the sensors and gas valve controllers of a first air inlet and a second air inlet in a combustion chamber of a combustion device;
wherein the combustion device control system is configured to perform operations:
executing an automatic control mode according to a plurality of initial combustion parameters by the processor to obtain a combustion trend score at each of a plurality of time points;
obtaining a first combustion light wavelength of the combustion chamber at a first time point of the time points by the sensors;
evaluating a combustion situation at the first time point according to the first combustion light wavelength by the processor to obtain a combustion state score;
outputting a control signal at a second time point to the gas valve controllers according to the combustion trend score and the combustion state score corresponding to the first time point by the processor, wherein the second time point is later than the first time point; and
adjusting a first gas in the first air inlet and a second gas in the second air inlet according to the control signal at the second time point by the gas valve controller of each of the first air inlet and the second air inlet, wherein the combustion trend score is established by:
generating a plurality of combustion parameter combinations according to the initial combustion parameters by the processor, wherein each of the combustion parameter combinations is different;
determining a target combustion parameter combination according to the combustion parameter combinations by the processor; and
obtaining the combustion trend score at each of the time points according to the target combustion parameter combination by the processor.

2. The combustion device control system of claim 1, wherein the initial combustion parameters comprise at least one of a temperature of the combustion chamber, a gas pressure, a gas supply speed and a gas concentration of each of the first gas and the second gas.

3. The combustion device control system of claim 1, wherein the processor is configured to execute operations:

establishing a plurality of three-dimensional models corresponding to the combustion chamber;

executing each of the combustion parameter combinations by the three-dimensional models respectively to generate a simulation result corresponding to each of the combustion parameter combinations;

calculating an expectation value of each of the simulation results;

selecting a target expectation value from the expectation values; and determining the target combustion parameter combination according to the target expectation value.

4. The combustion device control system of claim 1, wherein the combustion parameter combinations comprise at least one of a temperature of the combustion chamber, a pressure, a gas supply speed and a gas concentration of each of the first gas and the second gas and a concentration of at least one post combustion gas.

5. The combustion device control system of claim 1, wherein a step of obtaining the combustion state score further comprises:

evaluating the combustion situation at the first time point according to a concentration of at least one post combustion gas corresponding to the first combustion light wavelength by the processor to obtain the combustion state score.

6. The combustion device control system of claim 5, wherein the processor is configured to execute operations:

determining whether the combustion chamber is in a complete combustion state at the first time point according to the concentration of the at least one post combustion gas.

7. The combustion device control system of claim 6, wherein the at least one post combustion gas comprises at least one of sulfur oxides, carbon oxide and nitrogen oxides.

8. The combustion device control system of claim 1, further comprising:

a display device, coupled to the processor, wherein the display device is configured to display the initial combustion parameters, the combustion trend score of each of the time points, wherein the display device is configured to receive an operation instruction to switch from the automatic control mode to a manual control mode.

9. The combustion device control system of claim 1, wherein the processor is further configured to execute operations:

determining whether the combustion trend score corresponding to the first time point is less than the combustion state score corresponding to the first time point;

narrowing a pressure adjustment range of each of the first gas and the second gas in response to the combustion trend score being less than the combustion state score; and enlarging the pressure adjustment range of each of the first gas and the second gas in response to the combustion trend score being not less than the combustion state score.

10. A combustion device control method, adapted to a combustion device control system, wherein the combustion device control system comprises a plurality of sensors and a processor, wherein the processor is coupled to at least two gas valve controllers of a combustion device, wherein the combustion device control method comprises:

executing an automatic control mode according to a plurality of initial combustion parameters by the processor to obtain a combustion trend score at each of a plurality of time points;

obtaining a first combustion light wavelength of a combustion chamber of the combustion device at a first time point of the time points by the sensors;

evaluating a combustion situation at the first time point according to the first combustion light wavelength by the processor to obtain a combustion state score; and outputting a control signal at a second time point to the gas valve controllers according to the combustion trend score and the combustion state score corresponding to the first time point by the processor, wherein the second time point is later than the first time point; and respectively adjusting an air inlet hole for a first gas and an air inlet hole for a second gas of the combustion device according to the control signal at the second time point by the at least two gas valve controllers, wherein the combustion trend score is established by:

generating a plurality of combustion parameter combinations according to the initial combustion parameters by the processor, wherein each of the combustion parameter combinations is different;

determining a target combustion parameter combination according to the combustion parameter combinations by the processor; and obtaining the combustion trend score each of the time points according to the target combustion parameter combinations by the processor.

11. The combustion device control method of claim 10, further comprising:

determining whether the combustion trend score corresponding to the first time point is less than the combustion state score corresponding to the first time point;

narrowing an adjustment range of each of the first gas and the second gas in response to the combustion trend score being less than the combustion state score; and enlarging the adjustment range of each of the first gas and the second gas in response to the combustion trend score being not less than the combustion state score.

12. The combustion device control method of claim 10, further comprising:

establishing a plurality of three-dimensional models corresponding to the combustion chamber by the processor;

executing each of the combustion parameter combinations by the three-dimensional models respectively to generate a simulation result corresponding to each of the combustion parameter combinations by the processor;

calculating an expectation value of each of the simulation results by the processor;

selecting a target expectation value from the expectation values by the processor; and determining the target combustion parameter combination according to the target expectation value by the processor.

13. The combustion device control method of claim 10, wherein the combustion parameter combinations comprise at least one of a temperature of the combustion chamber, a pressure, a gas supply speed and a gas concentration of each of the first gas and the second gas and a concentration of at least one post combustion gas.

* * * * *